Patented July 24, 1951

UNITED STATES PATENT OFFICE 2,561,513

PROCESS FOR COATING AND COATING COMPOSITIONS

William B. Horback, Irvington, and Walter D. Paist, Orange, N. J., assignors to Celanese Corporation of America, a corporation of Delaware No Drawing. Application October 20, 1948, Serial No. 55,646

10 Claims. (Cl. 117—25)

This invention relates to the manufacture or treatment of polymeric products of high molecular weight and relates more particularly to certain novel compositions comprising high molecular weight polymers of unhalogenated organic compounds containing a vinyl group in a solvent medium comprising essentially methylal, i. e. methylene dimethyl ether.

An object of this invention is the production of compositions comprising a high molecular weight unhalogenated vinyl polymer in a solvent medium comprising essentially methylal.

Another object of this invention is the production of decorative sheet materials having a basis of a high molecular weight unhalogenated vinyl polymer or the treatment of articles of a high molecular weight polymer employing methylal as a solvent or softening agent in the production of said sheet materials.

High molecular weight polymers are widely employed industrially and new uses for said polymeric compounds are continually being sought. An important factor which determines the applicability of many high molecular weight polymers is the availability of inexpensive yet effective low boiling solvents for said materials capable of forming clear solutions, or of forming compatible mixtures which contain a plurality of said polymeric compounds.

We have now found that solutions capable of wide industrial use may be obtained if polymeric compounds comprising the polymers of certain unhalogenated organic compounds containing a vinyl group are dissolved in a solvent medium therefor comprising essentially methylal. The latter exhibits excellent solvent power for polymers of unhalogenated vinyl compounds such as, for example, polystyrene, polyvinyl acetate, polyvinyl formals, acetals and butyrals, polymerized methyl acrylate and polymerized methyl methacrylate. It is quite surprising that methylal has no solvent action on polymers of the halogenated vinyl compounds, a selectivity which constitutes an unusual and valuable property.

Thus, in accordance with our invention, methylal may be employed as a solvent or softening agent in the preparation of dopes, varnishes, lacquers or like coating or adhesive compositions having a basis of said unhalogenated vinyl polymers, or in the preparation of solutions for the manufacture of artificial filaments, ribbons, films, foils, sheets and the like by dry or wet spinning processes or for the further shaping or treatment of said formed materials. Methylal constitutes an extremely valuable low-boiling solvent in said compositions or for said treatments.

Where a plasticizer is incorporated in the polymerized vinyl compound, the plasticizer may be introduced therein as a solution in methylal and, after rendering the composition homogeneous, the methylal may be easily removed due to its relatively high volatility. Alternatively, the polymerized vinyl compound in particle or in sheet form may be sprayed with a plasticizer composition employing methylal as the plasticizer solvent and the polymer then worked on rollers until the plasticizer thus applied is uniformly incorporated therein, the application of heat subsequently acting to remove the volatile methylal.

Where it is desired to cement or otherwise assemble or join materials having a basis of said polymerized vinyl compounds, it has been found that cements or softening compositions made of or containing methylal are valuable for this purpose. The high degree of solvent action on said polymerized vinyl compounds readily softens the same and upon the application of pressure a quick and permanent seal or union is effected. Acetone, methyl acetate, benzol and dioxan, for example, are suitable diluents which are miscible with methylal. Cements containing said polymerized vinyl compounds as a fiber-forming component yield excellent results. Particularly valuable results are obtained in the production of cements containing a synthetic rubber of the copolymer type where styrene and butadiene are the copolymerized reactants.

Methylal may also be employed in compositions for the treatment of materials formed of a polymerized vinyl compound for the purpose of dyeing, printing, loading, vaporizing prior to polishing or otherwise applying materials to the external surfaces thereof. The methylal may be incorporated in a printing ink or may be applied as a softening agent followed by the application of pigments, tinsel, or flock materials in order to produce a local or an overall decorative effect.

Other decorative effects may be obtained by the local application of methylal, or a composition comprising essentially methylal, followed by the local shaping or embossing of the softened material or surface whereby a permanent intaglio or cameo effect may be produced.

In order further to illustrate our invention, but without being limited thereto, the following examples are given:

*Example I*

1 part by weight of polyvinyl acetate is dissolved in 10 parts by weight of methylal to form a clear liquid adhesive composition. The adhesive composition thus formed is spread evenly upon paper surfaces and the adhesive coated surfaces then joined with the application of slight pressure. A very strong, firm bond, impervious to moisture, is obtained. This cement is also useful for cementing articles of wood, cloth, glass, metal, leather, etc.

*Example II*

Sheet material having a basis of polyvinyl acetal has locally applied thereto a liquid composition comprising 1 part by weight of methylal and 5 parts by weight of acetone. The locally softened polyvinyl acetal sheet material has a fine cotton flock material applied thereto. The sheet material carrying the flock is then subjected to a slight overall pressure by being passed between smooth rollers. The flock permanently adheres to the sheet stock locally where the methylal composition was applied and is readily removed from the other portions of the sheet by the application of a vacuum or by subjecting the sheet to a blast of compressed air. A highly decorative sheet is obtained. A multicolor pattern may be produced by subjecting the polyvinyl acetal sheet material to a plurality of treatments, a different color being applied on different locally softened areas.

*Example III*

1 part by weight of polymethyl methacrylate is dissolved in 5 parts by weight of methylal and 0.2 part by weight of ester gum. The liquid composition obtained is an excellent cement. If the amount of solvent present is increased to provide greater fluidity, the composition may be employed for coating purposes.

*Example IV*

A polyvinyl acetal sheet material is printed with an ink of the following compositions:

| | Parts by weight |
|---|---|
| Methylal | 5 |
| Polyvinyl acetate | 1 |
| Acetone | 1 |
| Suitable pigment (e. g., carbon black) | 1 |

A printed sheet material exhibiting a permanent black decorative effect is thus obtained.

It is to be understood that the foregoing detailed description is given merely by way of illustration and that many variations may be made therein without departing from the spirit of our invention.

Having described our invention, what we desire to secure by Letters Patent is:

1. Process for producing decorative sheet materials which comprises locally applying to a sheet having a basis of a high molecular weight polymeric compound comprising the polymer of an unhalogenated organic compound containing a vinyl group, a softening and solvent composition comprising essentially methylal, applying a decorative effect material to the locally softened areas and applying pressure to the surface of said sheet to bond the effect material to the surface of the sheet material.

2. Process for producing decorative sheet materials which comprises locally applying to a sheet having a basis of a high molecular weight polymeric compound comprising polyvinyl acetate, a softening and solvent composition comprising essentially methylal, applying a decorative effect material to the locally softened areas and applying pressure to the surface of said sheet to bond the effect material to the surface of the sheet material.

3. Process for producing decorative sheet materials which comprises locally applying to a sheet having a basis of a high molecular weight polymeric compound comprising polyvinyl acetal, a softening and solvent composition comprising essentially methylal, applying a decorative effect material to the locally softened areas and applying pressure to the surface of said sheet to bond the effect material to the surface of the sheet material.

4. Process for producing decorative sheet materials which comprises locally applying to a sheet having a basis of a high molecular weight polymeric compound comprising polymerized methyl methacrylate, a softening and solvent composition comprising essentially methylal, applying a decorative effect material to the locally softened areas and applying pressure to the surface of said sheet to bond the effect material to the surface of the sheet material.

5. An adhesive composition comprising a polymer of an unhalogenated organic compound containing a vinyl group dissolved in a solvent medium comprising essentially methylal.

6. An adhesive composition comprising a polymer of an unhalogenated organic compound containing a vinyl group dissolved in a solvent medium comprising essentially methylal and containing acetone.

7. An adhesive composition comprising polyvinyl acetal dissolved in a solvent medium comprising essentially methylal.

8. An adhesive composition comprising polyvinyl acetal dissolved in a solvent medium comprising essentially methylal and containing acetone.

9. An ink adapted to be employed for printing polyvinyl acetal sheet material comprising polyvinyl acetate and a finely-divided pigment incorporated in a mixture of methylal and acetone.

10. An ink adapted to be employed for printing polyvinyl acetal sheet material comprising one part by weight of polyvinyl acetate and a finely-divided pigment incorporated in a mixture consisting of five parts by weight of methylal and one part by weight of acetone.

WILLIAM B. HORBACK.
WALTER D. PAIST.

REFERENCES CITED

The following references are of record in the file of this patent:

UNITED STATES PATENTS

| Number | Name | Date |
|---|---|---|
| 1,979,084 | Sweeney | Oct. 30, 1934 |
| 2,160,904 | Reilly et al. | June 6, 1939 |
| 2,314,975 | Ford | Mar. 30, 1943 |
| 2,349,153 | Ferrante | May 16, 1944 |